(12) United States Patent  (10) Patent No.: US 9,110,195 B2
Whan et al.  (45) Date of Patent: Aug. 18, 2015

(54) ELECTROMAGNETIC AND ITS COMBINED SURVEYING APPARATUS AND METHOD

(75) Inventors: Wen J. Whan, El Monte, CA (US); Dakun Xu, Beijing (CN)

(73) Assignee: Wen J. Whan, El Monte, CA (US)

( * ) Notice: Subject to any disclaimer, the term of this patent is extended or adjusted under 35 U.S.C. 154(b) by 1052 days.

(21) Appl. No.: 13/195,252

(22) Filed: Aug. 1, 2011

(65) Prior Publication Data

US 2012/0262179 A1   Oct. 18, 2012

Related U.S. Application Data

(60) Provisional application No. 61/475,349, filed on Apr. 14, 2011.

(51) Int. Cl.
*G01V 3/15* (2006.01)
*G01V 3/12* (2006.01)
*G01V 11/00* (2006.01)

(52) U.S. Cl.
CPC ........ *G01V 11/00* (2013.01); *G01V 2210/6163* (2013.01)

(58) Field of Classification Search
USPC ....................................................... 324/345
See application file for complete search history.

(56) References Cited

U.S. PATENT DOCUMENTS

| 4,591,791 | A | | 5/1986 | Bostick, Jr. |
| 5,563,513 | A | | 10/1996 | Tasci et al. |
| 5,684,341 | A | * | 11/1997 | Steingroever .................. 307/16 |
| 7,126,338 | B2 | | 10/2006 | MacGregor et al. |
| 7,328,107 | B2 | | 2/2008 | Strack et al. |
| 7,340,348 | B2 | | 3/2008 | Strack et al. |
| 7,746,077 | B2 | | 6/2010 | Strack et al. |
| 7,800,374 | B2 | | 9/2010 | Strack et al. |
| 7,860,655 | B2 | | 12/2010 | Alumbaugh et al. |
| 7,894,989 | B2 | | 2/2011 | Srnka et al. |
| 2010/0172205 | A1 | | 7/2010 | Hillesund et al. |
| 2011/0273179 | A1 | * | 11/2011 | Sudow .......................... 324/334 |
| 2012/0280690 | A1 | * | 11/2012 | Ziolkowski ................... 324/338 |

* cited by examiner

*Primary Examiner* — Bot Ledynh
(74) *Attorney, Agent, or Firm* — Muncy, Geissler, Olds & Lowe, P.C.

(57) ABSTRACT

An electromagnetic and its combined surveying apparatus and method, utilizing small-sized one or three-dimensional magnetic field sensors with high dynamic range and high sensitivity, which can be used together with highly populated receivers for the electromagnetic exploration. The electrical field could be derived from the vertical component of the magnetic field of the highly populated receivers and the magneto-telluric data could be derived by measuring the three components of the magnetic data. Moreover, by means of connecting the same populated receivers with geophones or MEMS accelerometers, and moving the seismic sources together with the mobile electromagnetic source, seismic survey could be carried out. It is therefore able to undertake the interpretation of the seismic, electromagnetic and magneto-telluric data and perform a combined field exploration.

17 Claims, 7 Drawing Sheets

ELECTROMAGNETIC AND ITS COMBINED SURVEYING APPARATUS AND METHOD

TECHNICAL FIELD

The present invention relates to an electromagnetic and its combined surveying apparatus and method, utilizing small-sized one or three-dimensional magnetic field sensors with high dynamic range and high sensitivity, which can be used together with highly populated receivers for the electromagnetic exploration. The electrical field could be derived from the vertical component of the magnetic field of the highly populated receivers and the magneto-telluric data could be derived by measuring the three components of the magnetic data. Moreover, by means of connecting the same populated receivers together with geophones and MEMS (Micro Electro-Mechanical System) accelerometers, and moving the seismic sources together with the mobile electromagnetic source, seismic survey could be carried out. It is therefore able to undertake the interpretation of the seismic, electromagnetic and magneto-telluric data and perform a combined field exploration.

BACKGROUND

The conventional electromagnetic exploration for deep geo-electrical structure sounding uses a big loop or long grounded wire for the electromagnetic transmitter in order to generate enough transmitting moment. The magnetic field sensors at the receivers are usually air loops of fair size, coils with magnetic flux concentrator, or SQUID (Super-conducting Quantum Interference Device) magnetometers. For the marine electromagnetic exploration, it is easy to tow a long wire or a big loop transmitter. For onshore, the transmitter is usually at a fixed location while the receivers are moving in the areas from about one kilometer to up to few tens of kilometers away from the transmitter. Due to the size and weight of the conventional receivers, it is almost impossible to create a distributed receiver station comprising hundred or thousand receivers.

The one-, two-, or three-dimensional inversions are commonly used for the interpretation. The big transmitter which is a long grounded wire or a big size loop source is known to have source effect, especially when using one-dimensional inversion interpretation. The interpretation results could be different if one changes the actual transmitter location.

There has been a number of different US patents describing the use of electromagnetic deep soundings. The patent (U.S. Pat. No. 4,591,791) of Bostick Jr. X, Francis disclosed an electromagnetic exploration method for geophysical exploration, in which the variations in the earth's magnetic field are measured in two, non-parallel directions at one point in the exploration area. Simultaneously, the variations in the earth's electrical field parallel to the exploration line are measured at a number of points along the exploration line. The patent (U.S. Pat. No. 7,894,989) of Srnka, Leonard J, et al. disclosed a method for determining earth vertical electrical anisotropy from offshore electromagnetic exploration measurements. This method requires both online and offline data, which includes at least one electromagnetic field component sensitive at least predominantly to vertical resistivity and another component sensitive at least predominantly to horizontal resistivity. The patent (U.S. Pat. No. 7,126,338) of MacGregor, Lucy M, et al. disclosed an exploration method using electromagnetic sources aligned end-on and broadside relative to the same or different receivers. The patent (U.S. Pat. No. 4,617,518) of Srnka, Leonard J. disclosed a method and apparatus for offshore electromagnetic sounding utilizing wavelength effects to determine optimum source and detector positions. The patent (U.S. Pat. No. 55,563,513) of Tasci, Tahsin M, et al. disclosed an apparatus and method using an electric generator connected to a transmitter with a length of wire with grounded electrodes. The eddy currents induce magnetic field changes in the subsurface which can be measured at the surface of the earth with a magnetometer or induction coil. The patent (U.S. Pat. No. 7,746,077) of Strack, Kurt M., et al. disclosed a marine electromagnetic exploration method using a towed electric dipole and including a plurality of sensor modules disposed at spaced apart locations along a cable. Each module includes at least one magnetic field sensor and at least one pair of electrodes. The patent (U.S. Pat. No. 7,800,374) of Strack, Kurt M. disclosed a multi-component marine electromagnetic signal acquisition cable and system. The patent (U.S. Pat. No. 7,860,655) of Alumbaugh, David, et al. disclosed a technique for electromagnetically detecting thin resistive bodies in shallow water and terrestrial environments, which includes using a first sensor to perform a first electromagnetic field measurement to obtain first data, which is indicative of the presence of a resistive body. The first data is relatively sensitive to an effect that is caused by an air layer boundary. The technique includes using a second sensor to perform a second electromagnetic field measurement to obtain second data, which is indicative of the presence of the resistive body.

However, none of the above mentioned patents disclose a small size of electromagnetic transmitter with variable spectrum for variable deep sounding penetration and easy movement. Moreover, neither of the above mentioned patents disclose a high dynamic range, high sensitive magnetic field sensor which are easy to be distributed so that a big quantity of receivers could be setup at the field site.

There has been a number of US patents which describe the uses of electromagnetic exploration with seismic. The patent (U.S. Pat. No. 7,328,107) of Kurt M. Strack disclosed a method for interpreting spatial distribution of properties of the Earth's subsurface includes obtaining seismic data over an exploration area of the Earth's subsurface. Controlled source electromagnetic exploration data are obtained over substantially the same exploration area. Further data may include gravity, magnetics, seismic any type and borehole data. Constraints are successively derived from the data sets and also cross checked against reservoir data where available. The patent (U.S. Pat. No. 7,340,348) of Kurt M. Strack disclosed a Method for acquiring and Interpreting Seismoelectric and electroseismic data. The patent application with publication number US20100172205 of Oyvind Hillesund disclosed a method for marine geophysical exploration according to one aspect of the invention includes towing at least one geophysical sensor streamer in a body of water. The streamer includes a plurality of spaced apart electromagnetic field receivers disposed at spaced apart locations along the streamer. The streamer also includes a plurality of seismic sensors disposed at spaced apart locations. The seismic sensors each include at least one pressure responsive receiver and at least one particle motion responsive receiver. At selected times, a seismic energy source is actuated in the water. Particle motion and pressure seismic signals, and electromagnetic field signals are detected at the respective receivers.

However, none of the above mentioned patents disclose usage of the same distributed receivers with magnetic field sensors and geophones or MEMS (Micro Electro-Mechanical System) accelerometers for electromagnetic exploration and seismic exploration. Moreover, neither of the above mentioned patents disclosed a method and apparatus to acquire three-dimensional seismic and three-dimensional electromagnetic data during the same operation, and to derive the magneto-telluric data from the three components of the magnetic field measured by highly populated receivers at the field site.

In order to overcome above shortcomings, inventor had the motive to study and develop the present invention. After hard research and development, the inventor provides a reduced size electromagnetic transmitter so that the transmitter is easy to be moved especially for the onshore exploration. A high dynamic range, high sensitivity and small size magnetic field sensor is also used for easy field setup to make possible about highly populated receiver stations. Besides, a combined field operation of electromagnetic and seismic exploration, and the method to derive the magneto-telluric exploration from highly populated receivers with three component magnetic field sensors are also developed.

SUMMARY OF THE DISCLOSURE

An object of the present invention is to provide an electromagnetic and its combined surveying apparatus and method, where the adopted transmitters are small-sized so that it would be easy to be moved and implemented at the field site; multiple transmitters could be linked to give multiple power or work alternatively in order to save setup time; and each transmitter includes a wire loop or a loop connected by metal rods, which are easy to be towed by the trucks and setup at field.

Another object of the present invention is to provide an electromagnetic- and its combined surveying apparatus and method, where the energy spectrum of the electromagnetic transmitter can be controlled by controlling the width and ramp time of the pulse of the current waveform; and at each transmitter site, the energy of different spectrum could be used to create different depth of penetration.

Another object of the present invention is to provide an electromagnetic and its combined surveying apparatus and method, where a magnetic field sensor is designed to be small in physical size and with wide dynamic range and high sensitivity; hundreds or thousands of the sensors can be distributed at field site; and most of the receivers are located at fixed locations for a period of time while some of the receivers roll together with the transmitters.

Another object of the present invention is to provide an electromagnetic and its combined surveying method, where the electrical field can be derived from a highly populated electromagnetic field data, so as to obtain the magneto-telluric exploration data for deep sounding.

Another object of the present invention is to provide an electromagnetic and its combined surveying apparatus and method, where a receiver can be connected to geophones or MEMS (Micro Electro-Mechanical System) accelerometers and magnetic field sensors, so that seismic data and electromagnetic data can be acquired using the same receiver setup.

In order to achieve above object, the present invention provides an electromagnetic and its combined surveying apparatus and method by means of electromagnetic exploration or combined magneto-telluric and seismic exploration and comprising a plurality of receivers, and a plurality of mobile actuate electromagnetic and/or seismic sources. The receivers are distributed over the area to be explored and each receiver is connected with at least one of a one-component or three-component portable magnetic field sensor, geophones or MEMS accelerometers, and at least a pair of electrodes, for receiving and recording magnetic field data from the magnetic field sensor, and/or seismic data from the geophones or MEMS accelerometers, and/or electric field data from the pair of electrodes. The electromagnetic and/or seismic sources are moved in the vicinity of the receivers or rolled together with the receivers for emitting electromagnetic signals and/or seismic signals. By means of the analysis of the received and recorded magnetic field, and/or seismic, and/or electric field data, so as to determine the earth subsurface structure of the area to be explored.

The following detailed description, given by way of examples or embodiments, will best be understood in conjunction with the accompanying drawings.

DETAILED DESCRIPTION

The present invention discloses an electromagnetic and its combined surveying apparatus and method by means of electromagnetic exploration or combined magneto-telluric and seismic exploration; said apparatus comprising a plurality of receivers and a plurality of mobile actuate electromagnetic and/or seismic sources. The plurality of receivers are distributed over the area to be explored, each of which is connected with at least one of a one-component or three-component portable magnetic field sensor, geophones or MEMS (Micro Electro-Mechanical System) accelerometers, and at least a pair of electrodes, for receiving and recording the one or three-dimensional magnetic field data from the portable magnetic field sensor, and/or seismic data from the geophones or MEMS accelerometers, and/or electric field data from the pair of electrodes. The plurality of mobile actuate electromagnetic and/or seismic sources are moved in the vicinity of the receivers or rolled together with the receivers for emitting electromagnetic signals and/or seismic signals. Therefore, by means of analyzing the received and recorded magnetic field, seismic, and/or electric field data (for example, using an analyzing device), the earth subsurface structure of the area to be explored can be determined.

In one embodiment, the receivers are respectively connected with a one-component or three-component portable magnetic field sensor, and are distributed in the area to be explored at fixed locations for a period of time in order to receive and record magnetic field data continuously; and each mobile actuate electromagnetic source is an electromagnetic loop source and/or grounded wire source, and is movable so as to be arranged at different locations for transmission.

In another embodiment, each mobile actuate electromagnetic source is an electromagnetic loop source; and the receivers are respectively connected with a one-component or three-component portable magnetic field sensor, and are arranged in plural rows and rolled over in a certain direction by rolling the last row to the first row heading that direction in order to receive and record magnetic field data continuously; the electromagnetic loop sources are moved in above rolling direction and actuated to emit electromagnetic signals at a pre-scheduled time or at synchronized time from the radio frequency signal sent by a central controlling center.

In one embodiment, the receivers are respectively connected with a one-component or three-component portable magnetic field sensor and one or two pairs of electrodes, and are distributed in the area to be explored at fixed locations for a period of time in order to receive and record magnetic field and electric field data continuously; and each mobile actuate electromagnetic source is an electromagnetic loop source and/or grounded wire source, and is movable so as to be arranged at different locations for transmission.

In another embodiment, the receivers are respectively connected with a one-component or three-component portable magnetic field sensor and one or two pairs of electrodes, and each mobile actuate electromagnetic source is an electromagnetic loop source; the receivers are arranged in plural rows and rolled over in a certain direction by rolling the last row to the first row heading that direction in order to receive and record magnetic field and electric field data continuously; the electromagnetic loop sources are moved in above rolling direction and actuated to emit electromagnetic signals at a pre-scheduled time or at synchronized time from the radio frequency signal sent by a central controlling center.

In one embodiment, the receivers are respectively connected with one or two pairs of electrodes and geophones or MEMS accelerometers, and are distributed in the area to be explored at fixed locations for a period of time in order to receive and record electric field and seismic data continuously; and each mobile actuate electromagnetic source is an electromagnetic loop source and/or grounded wire source while the mobile actuate seismic sources are vibrators or explosives; above sources are movable to be arranged at different locations for transmission.

In another embodiment, the receivers are respectively connected with one or two pairs of electrodes and geophones or MEMS accelerometers, and each mobile actuate electromagnetic source is an electromagnetic loop source while the mobile actuate seismic sources are vibrators or explosives; the receivers are arranged in plural rows and rolled over in a certain direction by rolling the last row to the first row heading that direction in order to receive and record electric field and seismic data continuously; the electromagnetic loop sources and seismic sources are moved in above rolling direction and actuated to emit electromagnetic signals at a pre-scheduled time or at synchronized time from the radio frequency signal sent by a central controlling center.

In one embodiment, the receivers are respectively connected with a one-component or three-component portable magnetic field sensor and geophones or MEMS accelerometers, and are distributed in the area to be explored at fixed locations for a period of time in order to receive and record magnetic field and seismic data continuously; and each mobile actuate electromagnetic source is an electromagnetic loop source and/or grounded wire source while the mobile actuate seismic sources are vibrators or explosives; above sources are movable so as to be arranged at different locations for transmission.

In another embodiment, the receivers are respectively connected with a one-component or three-component portable magnetic field sensor and geophones or MEMS accelerometers, and each mobile actuate electromagnetic source is an electromagnetic loop source while the mobile actuate seismic sources are vibrators or explosives; the receivers are arranged in plural rows and rolled over in a certain direction by rolling the last row to the first row heading that direction in order to receive and record magnetic field and seismic data continuously; the electromagnetic loop sources and seismic sources are moved in above rolling direction and actuated to emit electromagnetic signals at a pre-scheduled time or at synchronized time from the radio frequency signal sent by a central controlling center.

In one embodiment, the receivers are respectively connected with a one-component or three-component portable magnetic field sensor, one or two pairs of electrodes, and geophones or MEMS accelerometers, and are distributed in the area to be explored at fixed locations for a period of time in order to receive and record magnetic field, electric field, and seismic data continuously; and each mobile actuate electromagnetic source is an electromagnetic loop source and/or grounded wire source while the mobile actuate seismic sources are vibrators or explosives; above sources are movable so as to be arranged at different locations for transmission.

In another embodiment, the receivers are respectively connected with a one-component or three-component portable magnetic field sensor, one or two pairs of electrodes, and geophones or MEMS accelerometers, and each mobile actuate electromagnetic source is an electromagnetic loop source while the mobile actuate seismic sources are vibrators or explosives; the receivers are arranged in plural rows and rolled over in a certain direction by rolling the last row to the first row heading that direction in order to receive and record magnetic field, electric field, and seismic data continuously; the electromagnetic loop sources and seismic sources are moved in above rolling direction and actuated to emit electromagnetic signals at a pre-scheduled time or at synchronized time from the radio frequency signal sent by a central controlling center.

In one embodiment, the receivers are respectively connected with a one-component or three-component portable magnetic field sensor, and are distributed in the area to be explored at fixed locations for a period of time in order to receive and record magnetic field data. Thereby, during the period when no source is transmitting, the magnetic field data can be used for static magnetic survey.

In another embodiment, the receivers are respectively connected with a one-component or three-component portable magnetic field sensor, and are distributed in the area to be explored at fixed locations for a period of time in order to receive and record magnetic field data. Thereby, electric field data can be derived from the time derivative of the vertical component of the magnetic field. The electric field data can be used for spontaneous potential survey during the period when no source is transmitting. Besides, the electric field data also can be used for electroseismic anomaly survey during the period when only seismic sources are transmitting.

In one embodiment, the receivers are respectively connected with a MEMS accelerometer, and are distributed in the area to be explored at fixed locations for a period of time in order to receive and record seismic data continuously. Thereby, at the period when no seismic source is transmitting, the seismic data can be used for gravity survey. Besides, the seismic data also can be used for electroseismic anomaly survey at the period when only electromagnetic source is transmitting.

In another embodiment, the receivers are respectively connected with one or two pairs of electrodes and are distributed in the area to be explored at fixed locations for a period of time in order to receive and record electric field data. Thereby, during the period when no source is transmitting, the electric field data can be used for spontaneous potential survey. Besides, the electric field data also can be used for electroseismic anomaly survey during the period when only seismic sources are transmitting.

In one embodiment, the each of the mobile actuate electromagnetic sources further comprises a loop, a generator, a transformer, a plurality of capacitor banks, and a high current pulse waveform generator. The high current pulse waveform generator further comprises a central processing unit capable of generating pulse width modulation, and a plurality of drivers for driving a plurality of insulated gate bipolar transistors so as to drive big current into the loop and to generate different pulse widths with different ramp times. Wherein, the loop further comprises wires or metal rods connected end by end. The high current pulse waveform generator is used for generating current waveforms with different controlled pulse widths and ramp times in accordance with different desired depths of penetration. Or, the high current pulse waveform generator is used for generating current waveforms with different controlled pulse widths and ramp times using the same capacitor banks by scaling down or up proportionally the current amplitude with respect to the ramp time.

In one embodiment, each of the mobile actuate electromagnetic sources is used to generating current waveforms with different controlled pulse widths and ramp times in accordance with different desired depths of penetration at a fixed location.

In another embodiment, the receivers are arranged in a high-density way sufficient to derive the electrical field from the vertical component of the magnetic field and are placed for a period of time in order to obtain the magneto-telluric data from the three-component magnetic field data.

In one embodiment, at least two mobile actuate electromagnetic sources are linked in parallel and synchronized to increase output power.

In another embodiment, each portable magnetic field sensor comprises a first magnetic field sensing unit and a second magnetic field sensing unit; the first magnetic field sensing unit has narrow magnetic field range and high sensitivity and is measured under the condition that the background magnetic field is canceled; the second magnetic field sensing unit has wide magnetic field range and low sensitivity and is used for producing currents flowing through a loop to cancel the background magnetic field at location of the first magnetic field sensor. The first magnetic field sensing unit is connected with a magnetic flux concentrator so as to enhance the sensitivity of the first magnetic field sensing unit. The second magnetic field sensing unit creates the current flowing through a coil, and the coil is a Helmholtz coil, a Solenoid coil, a loop wire, or a wire.

In another embodiment, each portable magnetic field sensor comprises a first magnetic field sensing unit and a second magnetic field sensing unit; the first and second magnetic field sensor are coil-type magnetic field sensors, magnetic tunnel junction sensors, or a magneto impedance sensors.

In one embodiment, each portable magnetic field sensor comprises a first magnetic field sensing unit and a second magnetic field sensing unit; the first magnetic field sensor is using a magnetic flux concentrator.

Figure 1:
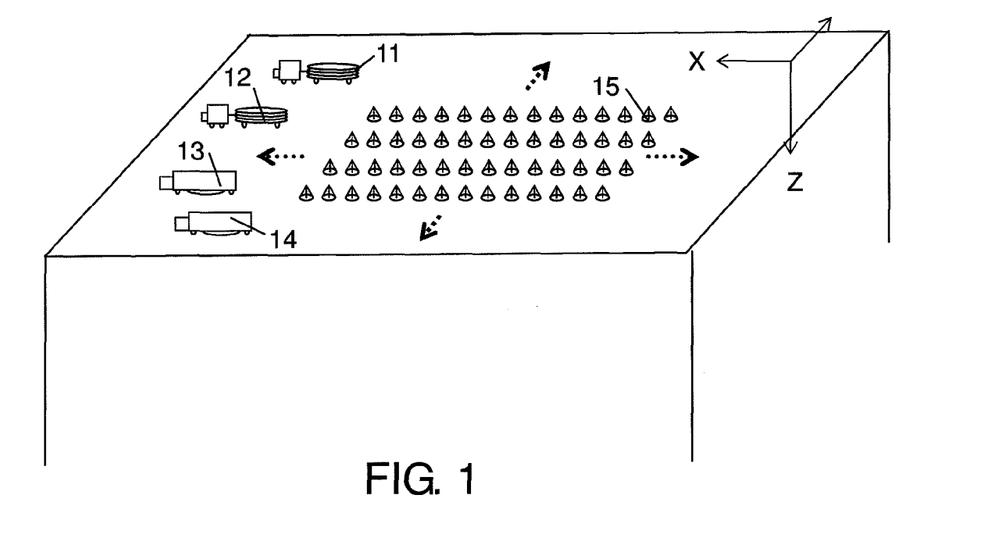
FIG. 1 shows the system configuration for distributed receivers with magnetic field sensors and geophones or MEMS (Micro Electro-Mechanical System) accelerometers according to the present invention. The distributed receivers could be on the grid or unevenly distributed in the area of interest while small size electromagnetic transmitters and seismic sources are moved in the area of interest.

The field data acquisition system is illustrated in FIG. 1. Hundreds or thousands of receivers 15 are distributed on a grid or randomly. The receivers 15 could be connected to one-or-three-component portable magnetic field sensors, pairs of electrodes for electrical field and geophones or MEMS accelerometers. In this embodiment, the mobile actuate electromagnetic and seismic sources are designed in form of transmitters. In other words, there are electromagnetic source transmitters 11, 12 and seismic source transmitters 13, 14. These transmitters are carried by trucks. These Truck towed transmitters are moved in the vicinity of the receivers or rolled together with the receivers in a certain direction by moving the transmitters and rolling the last raw of the receivers to the new front raw. In order to multiple the electromagnetic transmitting powers, several synchronized transmitters are used. In order to save the setup time multiple electromagnetic transmitters are setup and used alternatively. Using the same receivers the seismic transmitter sources are activated at the same time or alternatively with the electromagnetic transmitters. Field data is recorded using the same receivers for one or three components of the magnetic field, the electrical field from pairs of electrodes, and seismic data from the geophones or MEMS accelerometers.

Figure 2:
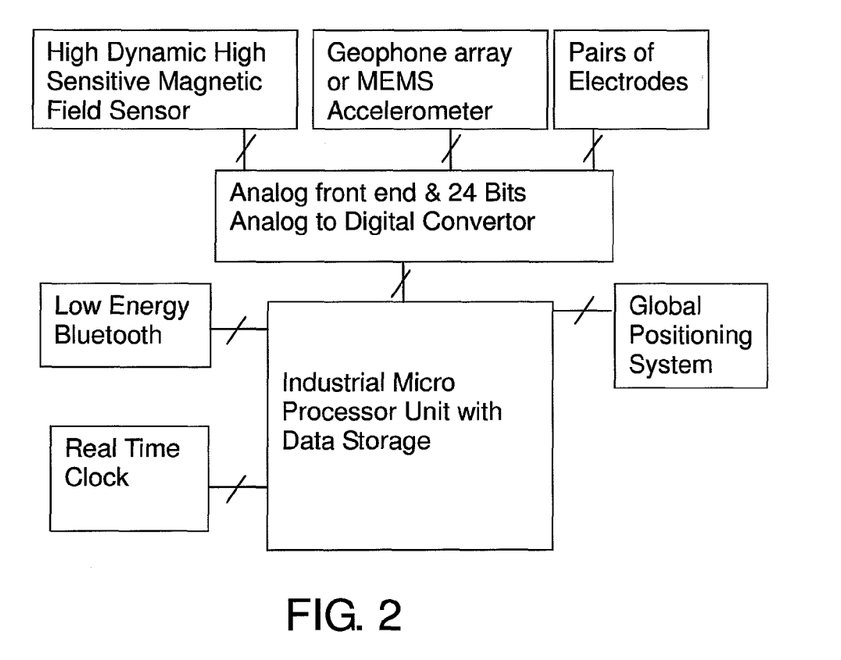
FIG. 2 is a block diagram showing a receiver connected to geophones or MEMS accelerometers, magnetic field sensors, and pairs of electrodes according to the present invention.

FIG. 2 illustrates a block diagram for the standalone receiver which consists of a GPS, radio transceiver, real time clock, main processor, data storage device, low drift analog front end, an interface for multiple channel analog to digital converter, and a wireless for local communication between the receiver and central station. The recorder could be connected to any of the follows or a combination of the follows: three or one component magnetic field sensor, a three dimensional MEMS accelerometers, an array of geophones and pair of electrodes. Synchronization during the field operation between the transmitters and receivers are very important. There are two ways to make the synchronization. One is to use a long-range radio frequency. The synchronizing signal is send from the controlling site to synchronize all the related recorders and transmitters. The second way is to use the GPS to synchronize the real time clock. All the real time clocks are synchronized using local wireless transceiver. The real time clock outputs a clock sequence for triggering the analog to digital conversion. The real time clock is programmed with a sequence of pre-schedule date/time and actions to be taken at that particular time. One example would be to start the data acquisition at some pre-set date and time for all the receivers. GPS could send out a clock signal which is one pulse per second (PPS). The real time is synchronized with the PPS from the GPS at every prescheduled time interval to reduce the time drift due to the real time clock.

Figure 3:
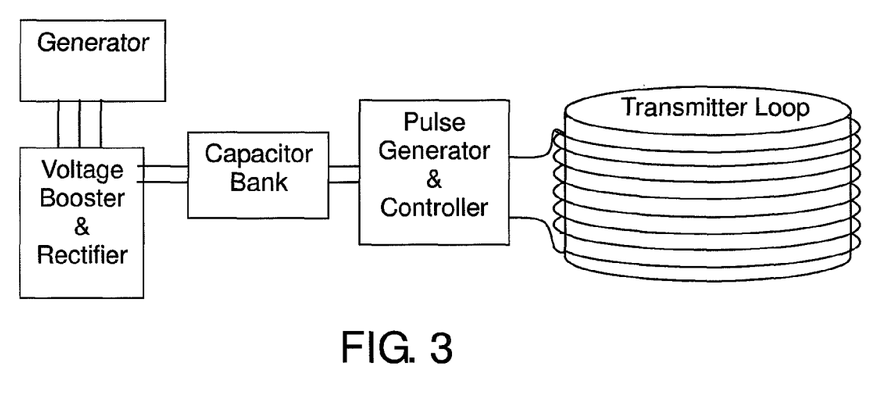
FIG. 3 is a block diagram showing the trucked mounted electromagnetic pulse transmitter.

FIG. 3 illustrates the block diagram for a tuck towed electromagnetic transmitter. The voltage from a three-phase generator is rectified and boosted, if necessary to generate higher voltage to charge the capacitor banks. The capacitor banks provide necessary power and the positive and negative voltages for the current waveform needed. A pulse generator uses pulse width modulation to control the pulse width and ramp time. A wire or jointed metal rods with multiple turns are used to form a transmitter loop which could be towed by a truck. Multiple IGBTs are used in parallel to create the current waveform in big scale.

Figure 4:
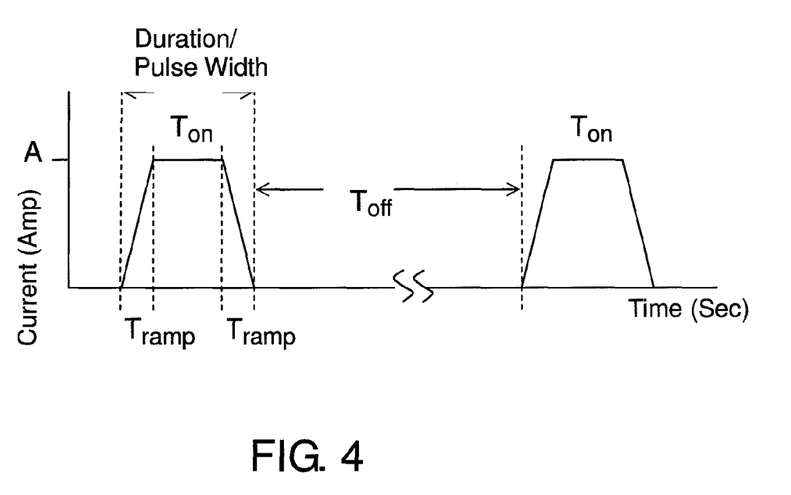
FIG. 4 shows the current waveform of the electromagnetic pulse transmitter with controlled amplitude, pulse width and ramp time.

FIG. 4 illustrates the current waveform generated for the electromagnetic loop transmitter. It is a pulse with pick current at "A" amperes and held for $T_{on}$ seconds. The turn on and turn off have ramp time of $T_{ramp}$ seconds. After the pulse, there is an off time with a period of $T_{off}$ seconds. The capacitor banks shall be fully charged during this period of time so that there is enough energy stored to fire the next pulse. The relation between the voltage (V) across point A and B as shown in FIG. 3 and current (I) injected into the loop is $$V=I*R+L(dI/dt) \qquad (1)$$

where R and L are the resistance and inductance of the loop respectively.

Figure 5:
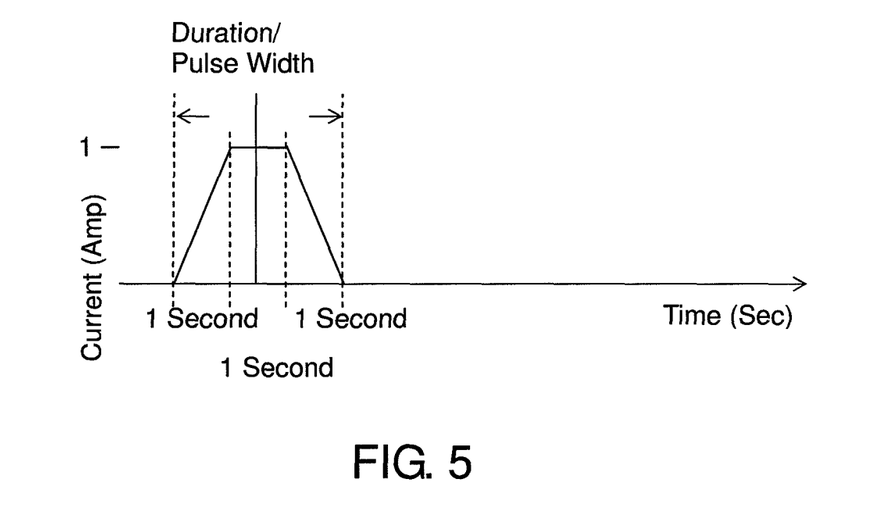
FIG. 5 shows the current waveform of the electromagnetic pulse transmitter with one-second ramp time and one second on time and "A" ampere amplitude.
Figure 6:
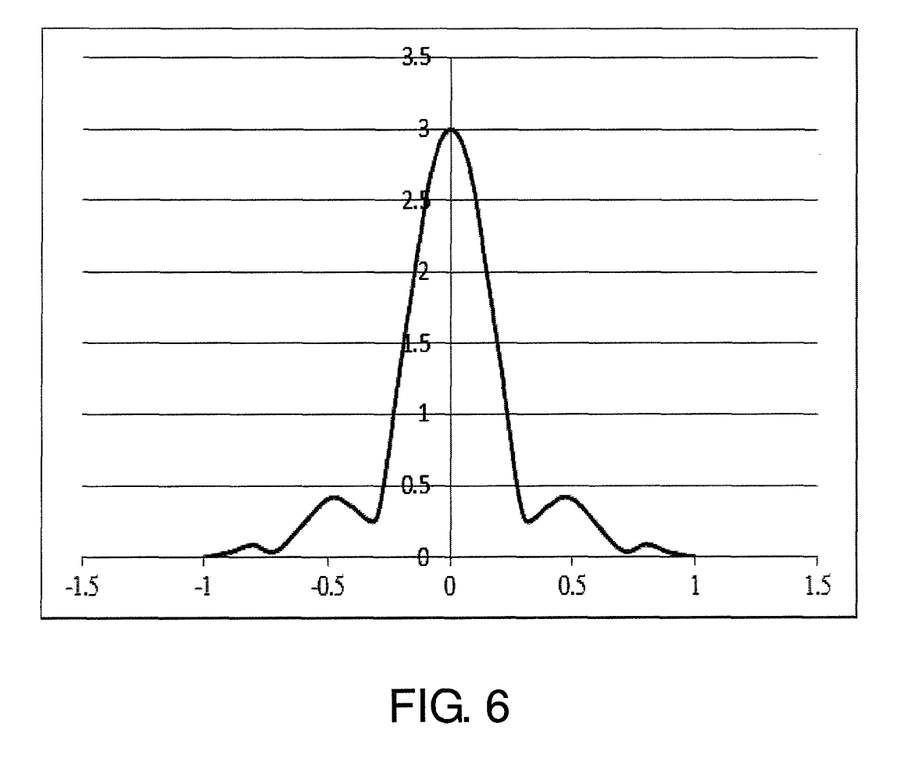
FIG. 6 shows the frequency response for the current waveform of the electromagnetic pulse transmitter in FIG. 5.
Figure 7:
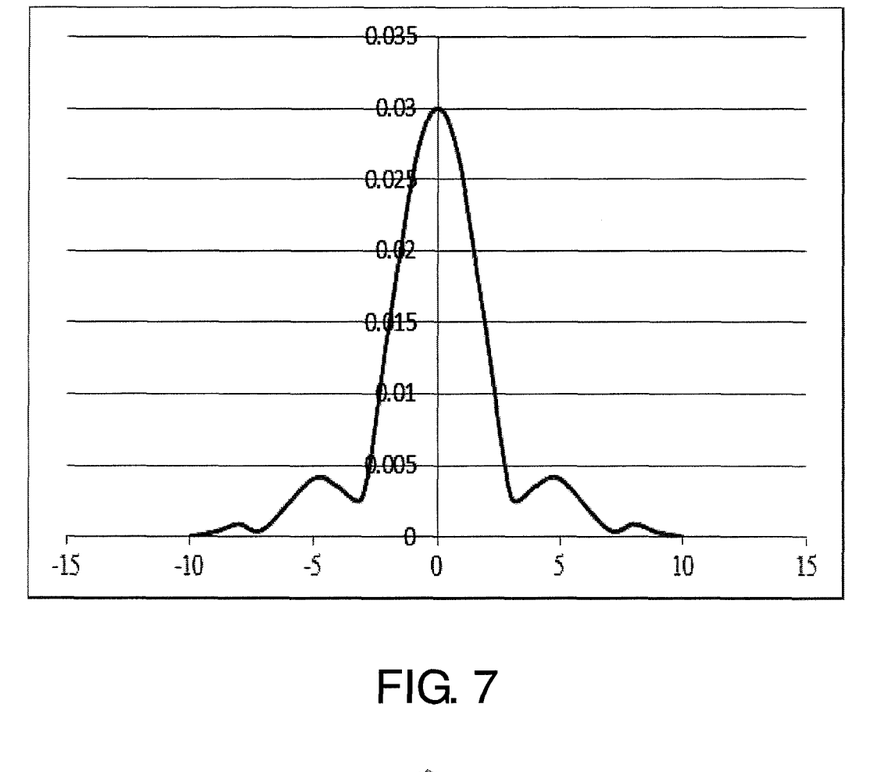
FIG. 7 shows the frequency response for the current waveform of the electromagnetic pulse transmitter with one tenth of a second ramp time and one tenth of a second on time and "A/10" ampere amplitude.

FIG. 5 shows the current waveform of a pulse with ramp time and holding time to be both one second while the pick amplitude be "1" ampere. FIG. 6 shows the frequency response for the current waveform shown in FIG. 5. FIG. 7 illustrates the frequency responses using the scale down pulse. The pick amplitude is scaled down to one tenth of the original value. The ramp time is decreased to one tenth of the original ramp time. The duration for the pick amplitude is also scaled down to one tenth of the original value. By scaling down the current waveform as described above, the frequency response of the current waveform would have lower amplitude but wider frequency spectrum. It means that the scale-down pulse should have more energy at higher frequency and hence is targeting for shallower structure sounding. The current amplitude is scaled down proportionally according to the rate of the ramp time decreased so that we could keep the supplying voltage at almost the same level due to ramp time and the inductance of the loop. For the above two examples, the voltage needed to drive the rising ramp time for the current waveform as shown in FIG. 5 is "L*d I/d t=L", while the voltage needed to drive the rising ramp time for the current waveform as shown in FIG. 7 is the same since the d I/d t is increased by a factor of 10 but the pick amplitude is also reduced by a factor of ten. This is a useful design since the same voltage supply could then be used for different pulses with different energy spectrum.

Figure 8:
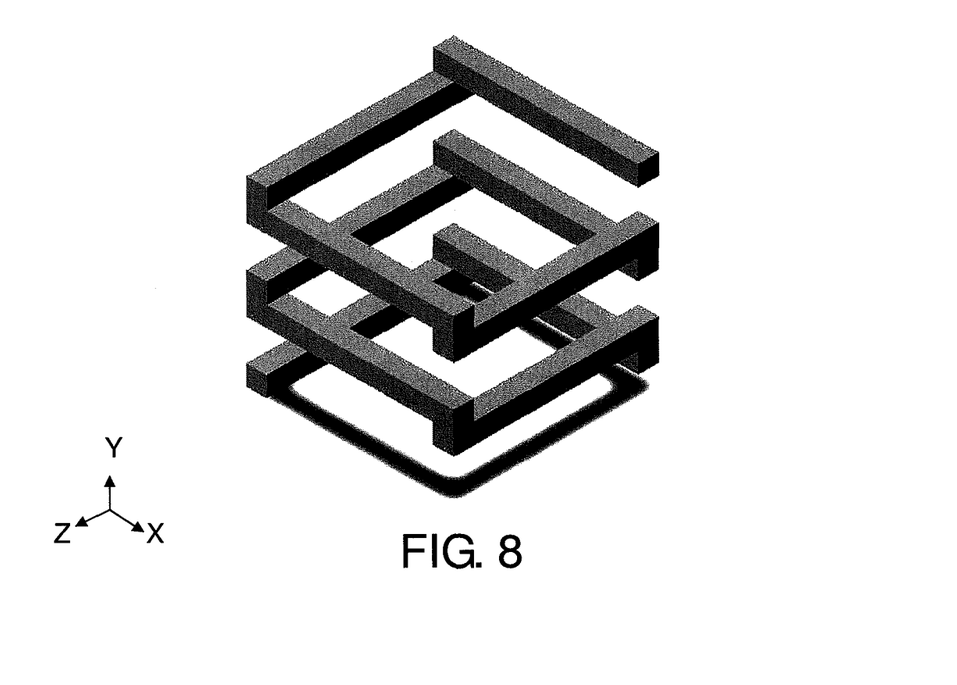
FIG. 8 shows a truck towed electromagnetic transmitter loop according to the present invention, which is made by using metal rods that are easily assembled at field sites.

FIG. 8 illustrates a method of using metal rods to form a loop. It gives a better resistance value compared with wires having the same cross section. The rods are pre-jointed with flexible wires to form a loop of multiple turns. The loop is easy to be setup and towed by a truck. The joints between each adjacent rod are screwed or welded with a more flexible wire.

Figure 9:
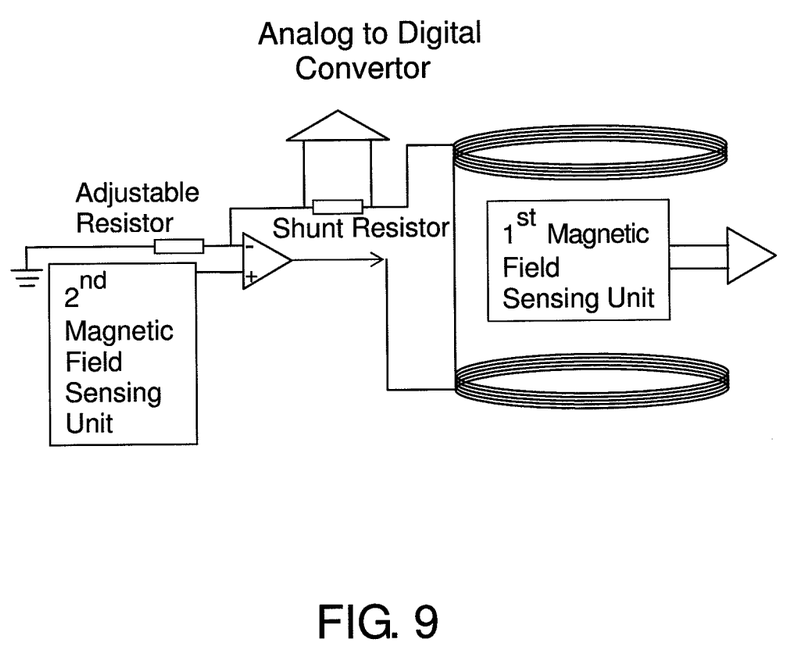
FIG. 9 shows a block diagram of a high dynamic magnetic field sensor using a second wide range magnetic field sensor to cancel the background magnetic field.

In FIG. 9, we show a method of a biased magnetic field sensor which gives wide dynamic range and high sensitivity. The biased current is generated from a second magnetic field sensing unit which has wide range but lower sensitivity. The current is fed into a Helmholtz coil to create a negative background field so that the field for the component along the axis of the coil at the central part of the Helmholtz coil is near zero. A first magnetic field sensing unit with higher sensitivity is located at the central part of the Helmholtz coil. The field from the higher sensitive magnetic field is measured. The background field is also calculated for the Helmholtz coil by measuring the current go through the coil. The final field is the sum of the both.

Figure 10:
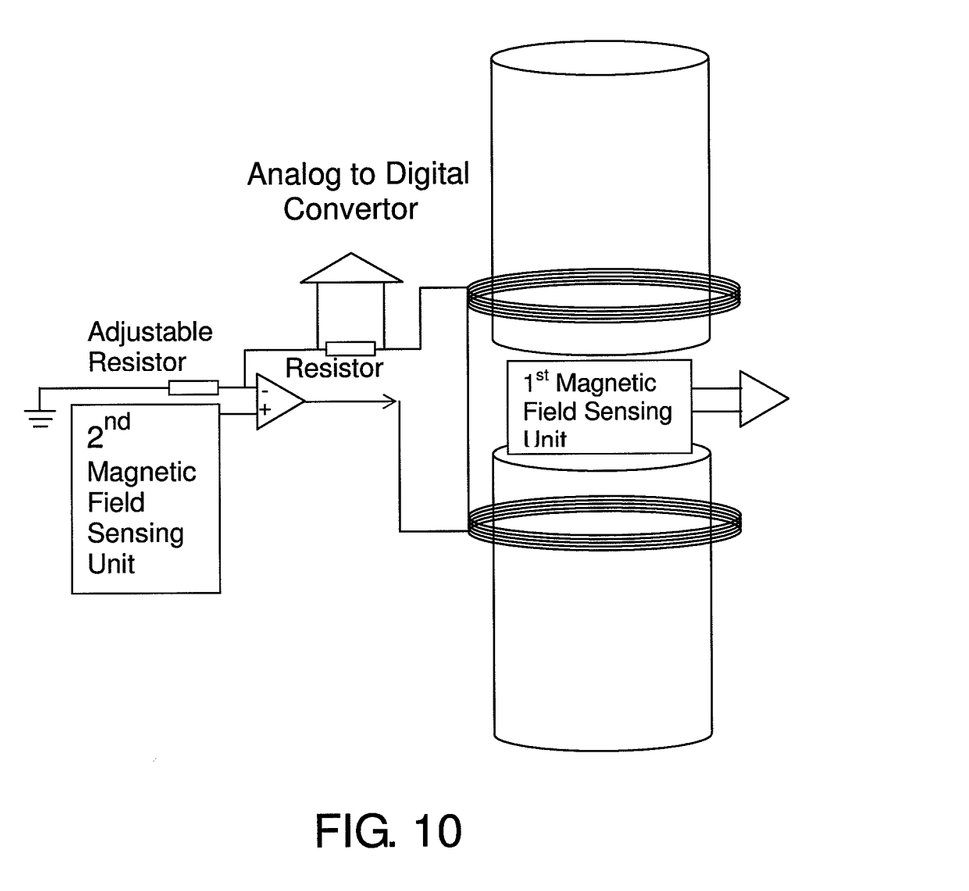
FIG. 10 shows a block diagram for a high sensitive magnetic field sensor using a flux concentrator.

FIG. 10 is the same as FIG. 9 except that a pair of magnetic flux concentrators is placed along the axis of the Helmholtz coil to increase the sensitivity of the first magnetic field sensing unit. The field at the central part of the Helmholtz coil with the magnetic flux concentrator is pre-measured. The relation between the current and the field for the component along the axis at the central part of the Helmholtz coil is derived. The field from the higher sensitive magnetic field is measured. The background field is also calculated for the Helmholtz coil by measuring the current going through the coil and then derived the field from the pre-decided relation of the current and the negative background field created. The final field is the sum of the both.

Figure 11:
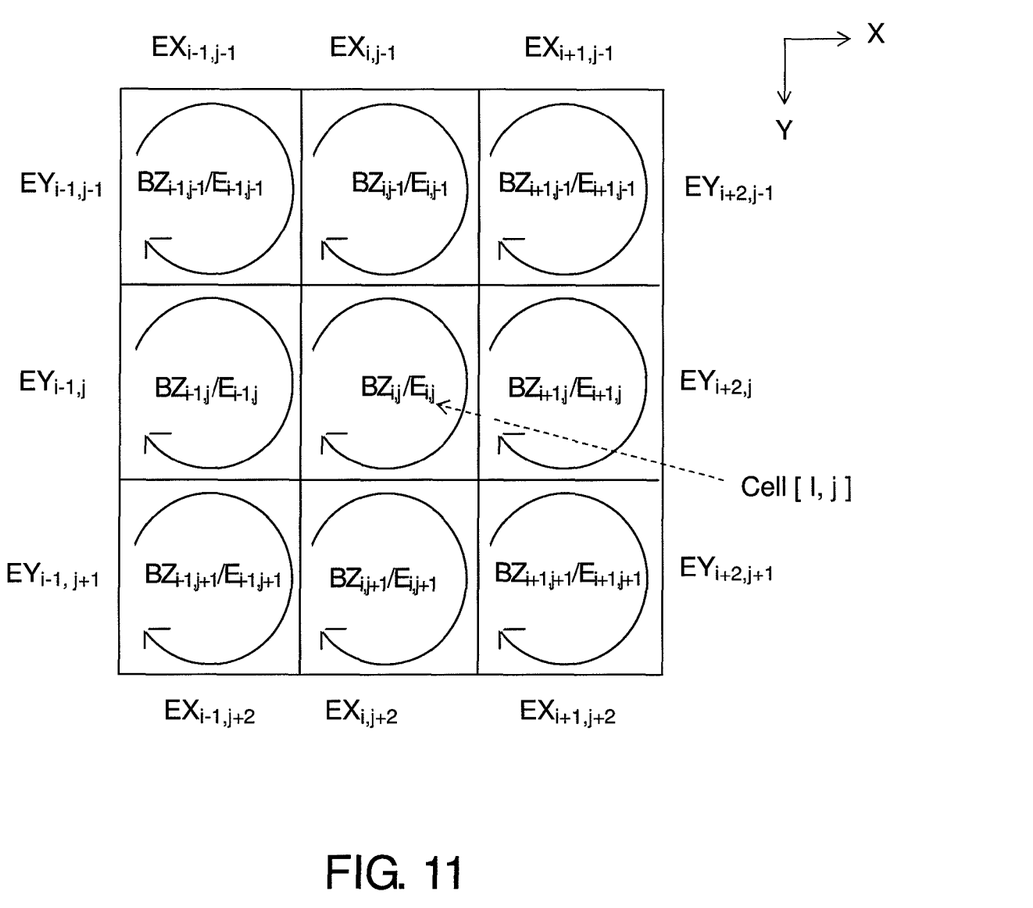
FIG. 11 shows notations for calculating the electrical field from the vertical component of electromagnetic field.

FIG. 11 represents the notations for calculating the electrical field from the vertical component of electromagnetic field. From Maxwell Equations, we get $$\oint E \cdot dx = -d\Phi n, s/dt \qquad (2)$$

Equation (2) states that the sum of the electrical field along a closed path equals to the negative change rate of the vertical components of the magnetic flux through the surface enclosed by the closed path. Assuming $E_{i,j}$ is the circular electrical field on the Cell[I,j] and $BZ_{i,j}$ is the vertical component of the magnetic field through the cell, also assuming the cell size is small enough so that both $E_{i,j}$ and $BZ_{i,j}$ are uniform, we get $$E_{i,j} = -(dl * dBZ_{i,j}/dt)/4 \qquad (3)$$

where dl is the distance between the grids.
The X component of the electrical field is then $$EX_{i,j} = E_{i,j} - E_{i,j-1},$$

while the Y component of the electrical field is $$EY_{i,j} = E_{i-1,j} - E_{i,j}$$

As disclosed in the above description and attached drawings, the present invention can provide an electromagnetic and its combined surveying apparatus and method by means of electromagnetic exploration or combined magneto-telluric and seismic exploration. It is new and can be put into industrial use.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:

1. An electromagnetic and its combined surveying apparatus by means of electromagnetic exploration or combined magneto-telluric and seismic exploration; said apparatus comprising:
   a plurality of receivers distributed over the area to be explored, each of which is connected with at least one of a one-component or three-component portable magnetic field sensor, geophones or MEMS (Micro Electro-Mechanical System) accelerometers, and at least a pair of electrodes, for receiving and recording the one or three-dimensional magnetic field data from the magnetic field sensor, and/or seismic data from the geophones or MEMS accelerometers, and/or electric field data from the pair of electrodes; and
   a plurality of mobile actuate electromagnetic and/or seismic sources, moved in the vicinity of the receivers or rolled together with the receivers for emitting electromagnetic signals and/or seismic signals,
   wherein each portable magnetic field sensor includes a first magnetic field sensing unit and a second magnetic field sensing unit; the first magnetic field sensing unit has narrow magnetic field range and high sensitivity and is measured under the condition that the background magnetic field is canceled; the second magnetic field sensing unit has wide magnetic field range and low sensitivity and is used for producing currents flowing through a loop to cancel the background magnetic field at location of the first magnetic field sensor.

2. The apparatus as claimed in claim 1, wherein the receivers are respectively connected with a one-component or three-component portable magnetic field sensor and one or two pairs of electrodes; and each mobile actuate electromagnetic source is an electromagnetic loop source and/or grounded wire source.

3. The apparatus as claimed in claim 1, wherein each of the mobile actuate electromagnetic sources further comprises a loop, a generator, a transformer, a plurality of capacitor banks, and a high current pulse waveform generator.

4. The apparatus as claimed in claim 3, wherein the high current pulse waveform generator further comprises a central processing unit capable of generating pulse width modulation, and a plurality of drivers for driving a plurality of insulated gate bipolar transistors so as to drive big current into the loop and to generate different pulse widths with different ramp times.

5. The apparatus as claimed in claim 3, wherein the loop further comprises wires or metal rods connected end by end.

6. The apparatus as claimed in claim 3, wherein the high current pulse waveform generator is used for generating current waveforms with different controlled pulse widths and ramp times in accordance with different desired depths of penetration.

7. The apparatus as claimed in claim 3, wherein the high current pulse waveform generator is used for generating current waveforms with different controlled pulse widths and ramp times using the same capacitor banks by scaling down or up proportionally the current amplitude with respect to the ramp time.

8. The apparatus as claimed in claim 3, wherein each of the mobile actuate electromagnetic sources is used to generating current waveforms with different controlled pulse widths and ramp times in accordance with different desired depths of penetration at a fixed location.

9. The apparatus as claimed in claim 1, wherein the receivers are arranged in a high-density way sufficient to derive the electrical field from the vertical component of the magnetic field and are placed for a period of time in order to obtain the magneto-telluric data from the three-component magnetic field data.

10. The apparatus as claimed in claim 1, wherein at least two mobile actuate electromagnetic sources are linked in parallel and synchronized to increase output power.

11. The apparatus as claimed in claim 1, wherein the first magnetic field sensing unit is connected with a magnetic flux concentrator so as to enhance the sensitivity of the first magnetic field sensing unit.

12. The apparatus as claimed in claim 1, wherein the second magnetic field sensing unit creates negative background magnetic field by creating the current flowing through a coil, and the coil is a Helmholtz coil, a Solenoid coil, a loop wire, or a wire.

13. The apparatus as claimed in claim 1, wherein the total magnetic field for the component in the direction measured is the background magnetic field created by the second magnetic field sensor plus the field measured by the first magnetic field sensor; the background magnetic field is calculated by measuring the current flowing through the coil.

14. The apparatus as claimed in claim 1, wherein the first and the second magnetic field sensor are a coil-type magnetic field sensor, a magnetic tunnel junction sensor, or a magneto impedance sensor.

15. An electromagnetic and its combined surveying method, comprising steps of:
distributing a plurality of receivers over the area to be explored;
connecting each receiver with at least one of a one-component or three-component portable magnetic field sensor, geophones or MEMS (Micro Electro-Mechanical System) accelerometers, and at least a pair of electrodes, for receiving and recording the one or three-dimensional magnetic field data from the magnetic field sensor, and/or seismic data from the geophones or MEMS accelerometers, and/or electric field data from the pair of electrodes; and
moving a plurality of mobile actuate electromagnetic and/or seismic sources in the vicinity of the receivers or rolled together with the receivers for emitting electromagnetic signals and/or seismic signals,
wherein the receivers are respectively connected with a one-component or three-component portable magnetic field sensor and one or two pairs of electrodes, and each mobile actuate electromagnetic source is an electromagnetic loop source; the receivers are arranged in plural rows and rolled over in a certain direction by rolling the last row to the first row heading that direction in order to receive and record magnetic field and electric field data continuously; the electromagnetic loop sources are moved in above rolling direction and actuated to emit electromagnetic signals at a pre-scheduled time or at synchronized time from the radio frequency signal sent by a central controlling center.

16. The method as claimed in claim 15, wherein the receivers are respectively connected with a one-component or three-component portable magnetic field sensor and one or two pairs of electrodes, and are distributed in the area to be explored at fixed locations for a period of time in order to receive and record magnetic field and electric field data continuously; and each mobile actuate electromagnetic source is an electromagnetic loop source and/or grounded wire source, and is movable so as to be arranged at different locations for transmission.

17. The apparatus as claimed in claim 15, wherein the receivers are arranged in a high-density way sufficient to derive the electrical field from the vertical component of the magnetic field and are placed for a period of time in order to obtain the magneto-telluric data from the three-component magnetic field data.

* * * * *